United States Patent
Hwang et al.

(10) Patent No.: US 10,291,343 B2
(45) Date of Patent: May 14, 2019

(54) METHOD AND USER EQUIPMENT FOR SELECTING CELL FOR WHICH TO PERFORM INTERFERENCE CANCELLATION

(71) Applicant: LG Electronics Inc., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 15/527,929

(22) PCT Filed: Dec. 1, 2015

(86) PCT No.: PCT/KR2015/012948
§ 371 (c)(1),
(2) Date: May 18, 2017

(87) PCT Pub. No.: WO2016/089070
PCT Pub. Date: Jun. 9, 2016

(65) Prior Publication Data
US 2018/0323895 A1    Nov. 8, 2018

Related U.S. Application Data

(60) Provisional application No. 62/087,806, filed on Dec. 5, 2014.

(51) Int. Cl.
*H04J 11/00* (2006.01)
*H04W 52/24* (2009.01)
(Continued)

(52) U.S. Cl.
CPC .......... *H04J 11/005* (2013.01); *H04B 17/318* (2015.01); *H04W 52/243* (2013.01); *H04W 52/40* (2013.01)

(58) Field of Classification Search
CPC .... H04J 11/005; H04B 17/318; H04W 52/243
(Continued)

(56) References Cited

U.S. PATENT DOCUMENTS 9,838,894 B2 * 12/2017 Hwang ............... H04J 11/0023
2012/0327795 A1   12/2012 Mallik et al.
(Continued)

FOREIGN PATENT DOCUMENTS

WO    2014/123389 A1    8/2014

OTHER PUBLICATIONS

"Consideration on the remaining issues about higher-layer signalling" 3GPP TSG RAN WG1 Meeting #77, Seoul, Korea, May 19-23, 2014; R1-142219.

*Primary Examiner* — Eugene Yun
(74) *Attorney, Agent, or Firm* — Dentons US LLP

(57) ABSTRACT

A disclosure of the present specification provides a method for selecting a cell for which to perform interference cancellation. The method may comprise the steps of: measuring reception power on the basis of reference signals received from neighboring cells; measuring the reception power of a data channel received from a serving cell; selecting a candidate cell among the neighboring cells by comparing the reception power of the data channel from the serving cell with the reception power from the neighboring cells; performing blind detection only for the candidate cell; measuring the reception power of a data channel from the neighboring cell on the basis of the blind detection; and when the reception power of the data channel from the neighboring cell is larger by at least a threshold than the reception power of the data channel from the serving cell, selecting the candidate channel as a cell for which to perform interference cancellation.

10 Claims, 15 Drawing Sheets

(51) Int. Cl.
*H04B 17/318* (2015.01)
*H04W 52/40* (2009.01)

(58) Field of Classification Search
USPC .......................................................... 455/63.2
See application file for complete search history.

(56) References Cited

U.S. PATENT DOCUMENTS

2014/0086371 A1   3/2014   Li et al.
2014/0357255 A1   12/2014  Jonsson et al.

* cited by examiner

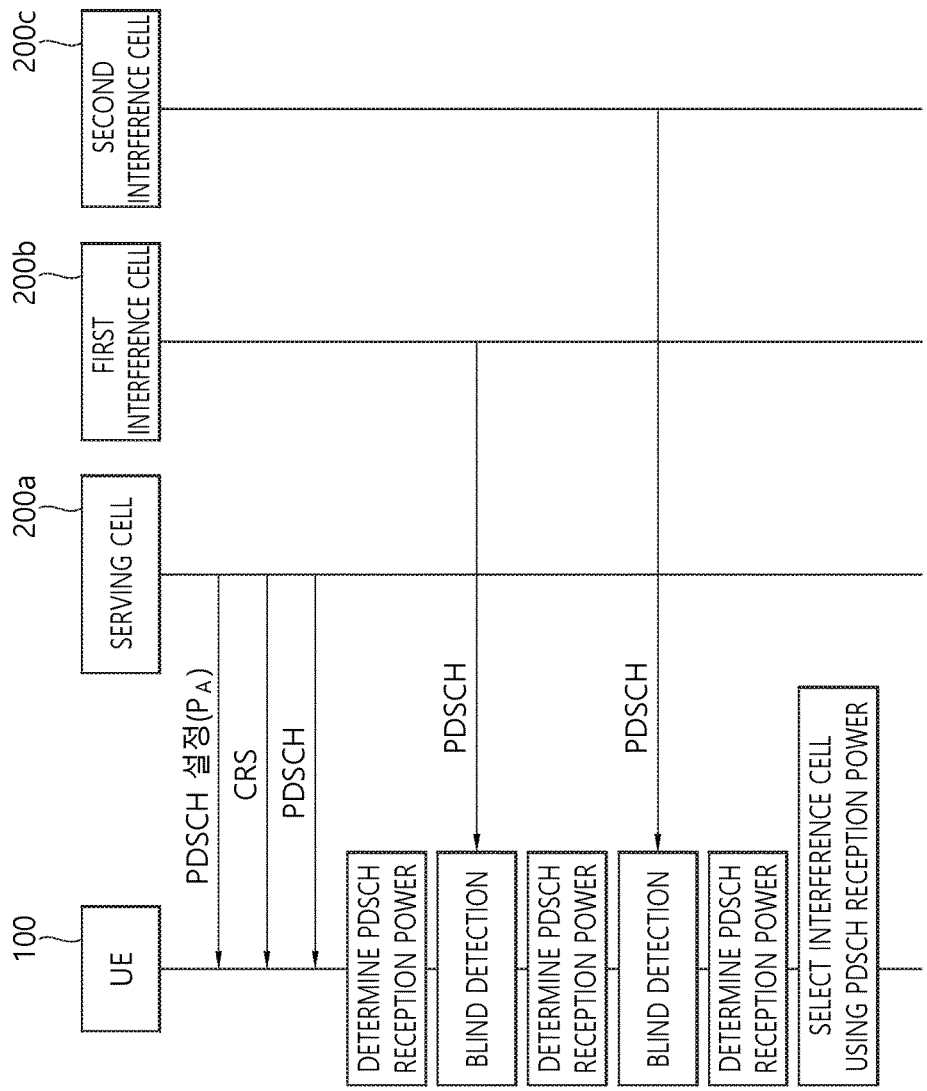

METHOD AND USER EQUIPMENT FOR SELECTING CELL FOR WHICH TO PERFORM INTERFERENCE CANCELLATION

CROSS-REFERENCE TO RELATED APPLICATIONS

This application is the National Stage filing under 35 U.S.C. 371 of International Application No. PCT/KR2015/012948, filed on Dec. 1, 2015, which claims the benefit of U.S. Provisional Application No. 62/087,806 filed on Dec. 5, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, it is expected that small cells with small cell coverage are added to the coverage of a macrocell in a next-generation mobile communication system.

The addition of small cells may further aggravate inter-cell interference.

However, when a larger number of neighboring cells are present, it is difficult to select a cell mainly causing interference.

SUMMARY OF THE INVENTION

Accordingly, a disclosure of the present specification has been made in an effort to solve the aforementioned problem.

In an aspect, a method for selecting an interference cancellation target cell (or a cell for which to perform interference cancellation) is provided. The method may include: measuring reception power based on reference signals received from neighboring cells; measuring reception power of a data channel received from a serving cell; comparing the reception power of the data channel from the serving cell with the reception power from the neighboring cells and selecting a candidate cell from among the neighboring cells; performing blind detection only on the candidate cell; measuring reception power of a data channel of a neighboring cell based on the blind detection; and when the reception power of the data channel from the neighboring cell is larger by at least a threshold than the reception power of the data channel from the serving cell, selecting the candidate cell as an interference cancellation target cell.

The method may further include: canceling interference based on a data channel received from the selected interference cancellation target cell.

A parameter for calculating a ratio of power of a data channel to power of an interference cell reference signal may be obtained.

When the reception power of the data channel from the neighboring cell through blind detection is not larger by at least the threshold than the reception power of the data channel from the serving cell, the process may be returned to the selecting of a candidate cell.

The reference signal may be a cell-specific reference signal (CRS), reception power based on the reference signal may be reference signal received power (RSRP), and the data channel may be a physical downlink shared channel (PDSCH).

In another aspect, a user equipment (UE) performing reception after canceling interference is provided. The UE may include: a radio frequency (RF) unit; and a processor controlling the RF unit. The processor may perform: measuring reception power based on reference signals received from neighboring cells; measuring reception power of a data channel received from a serving cell; comparing the reception power of the data channel from the serving cell with the reception power from the neighboring cells and selecting a candidate cell from among the neighboring cells; performing blind detection only on the candidate cell; measuring reception power of a data channel of a neighboring cell based on the blind detection; and when the reception power of the data channel from the neighboring cell is larger by at least a threshold than the reception power of the data channel from the serving cell, selecting the candidate cell as an interference cancellation target cell.

According to the present disclosure, an unnecessary operation of the UE is removed by effectively selecting a cell causing actual interference, and reception performance of a signal may be improved through cancellation of interference from a dominant interference cell.

BRIEF DESCRIPTION OF THE DRAWINGS

FIG. 10C is a view illustrating a method of selecting an interference cell based on reception power of a PDSCH.

DESCRIPTION OF EXEMPLARY EMBODIMENTS

Figure 1:
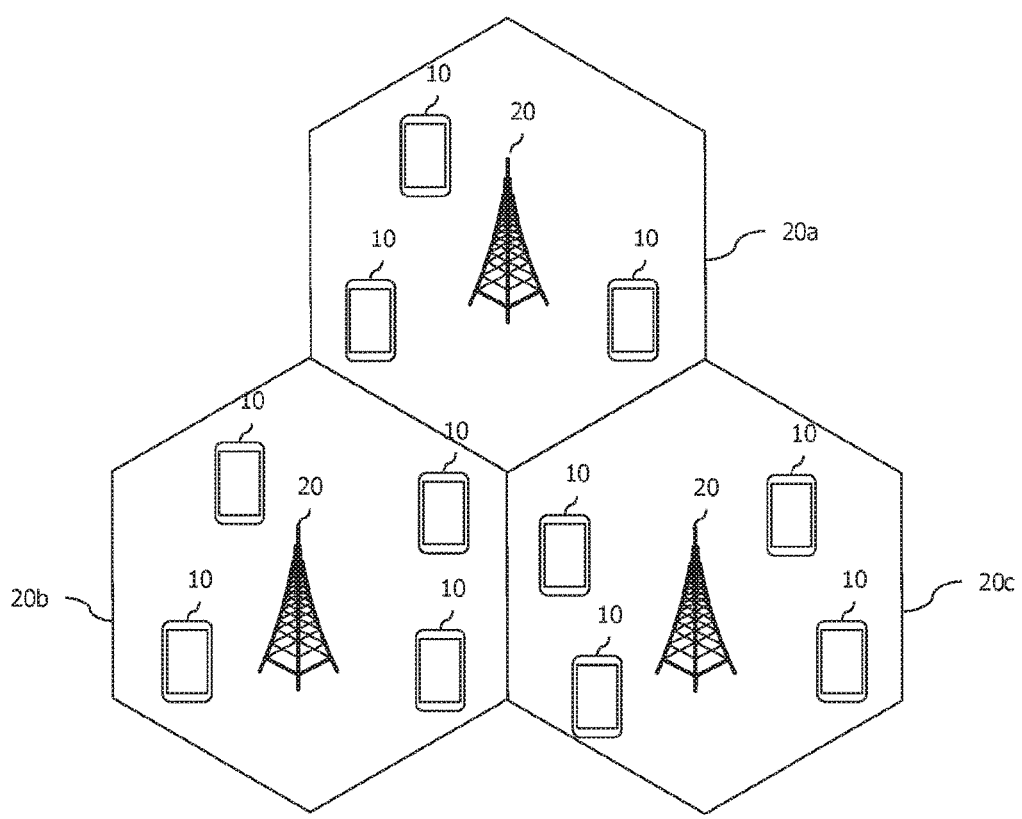
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighboring cell. A base station that provides the communication service to the neighboring cell is referred to as a neighbor BS. The serving cell and the neighboring cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
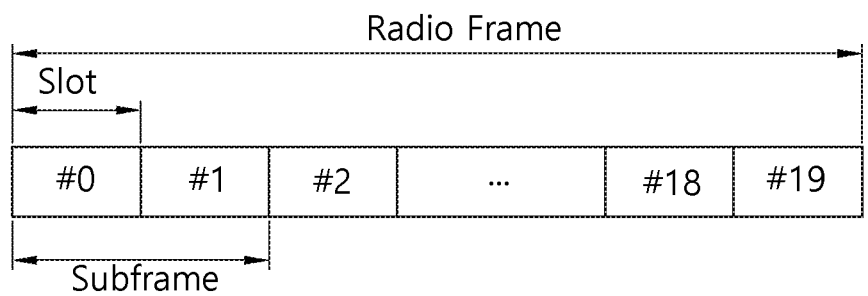
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
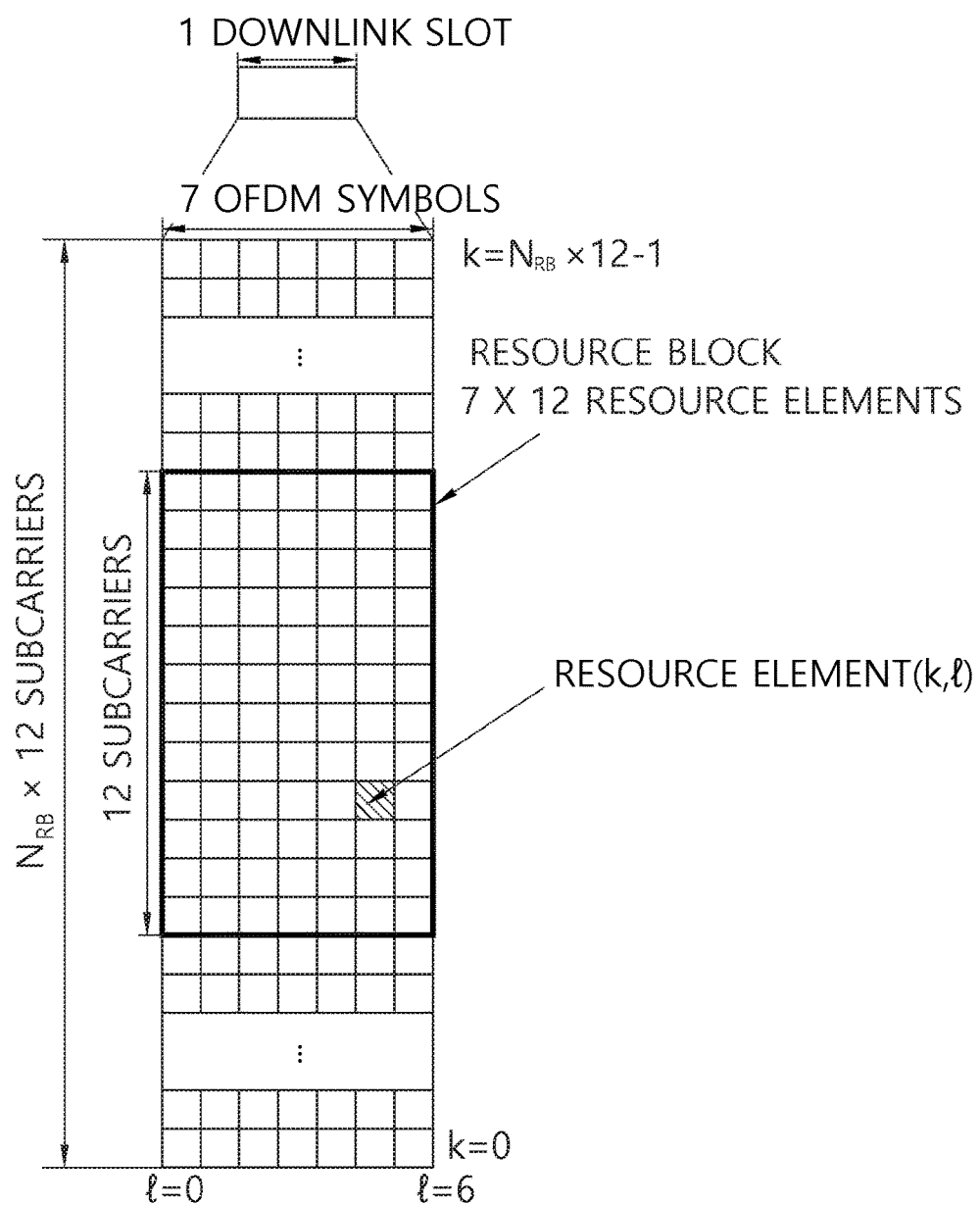
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
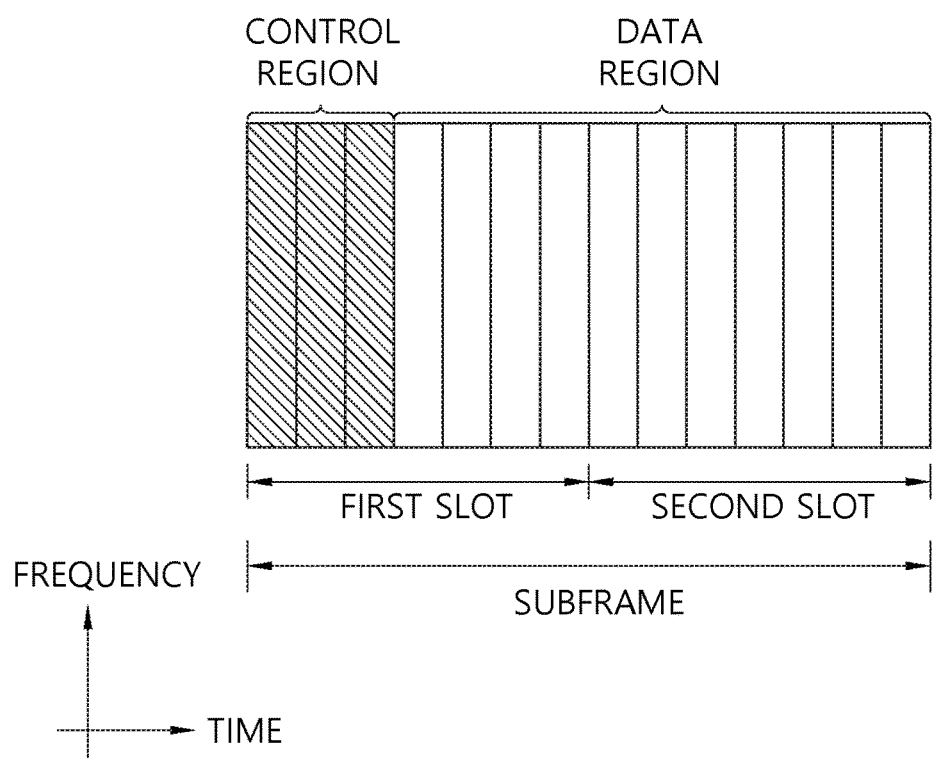
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
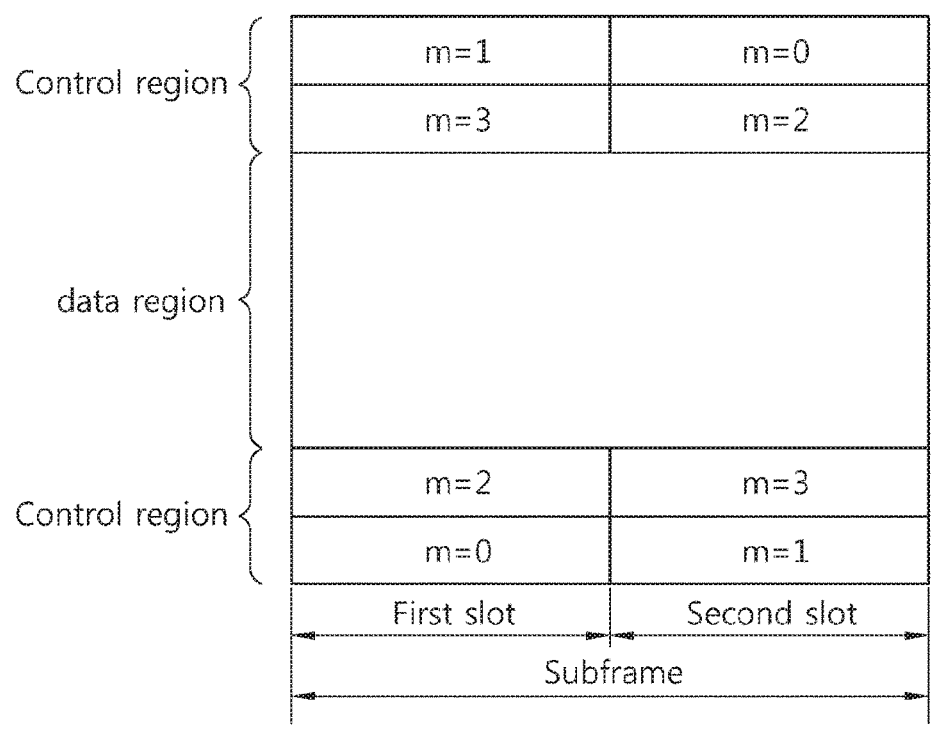
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed.

For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

Figure 6:
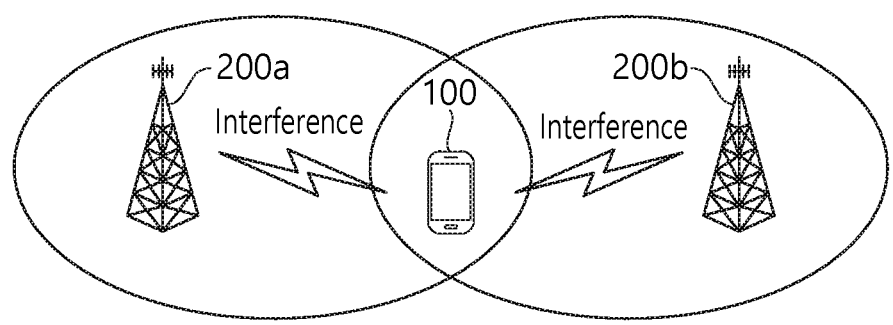
FIG. 6 illustrates inter-cell interference.

FIG. 6 illustrates inter-cell interference.

As illustrated in FIG. 6, when a UE 100 is located in an overlapping area of the coverage of a first cell 200a and the coverage of a second cell 200b, a signal of the first cell 200a acts as an interference with a second signal of the second cell 200b, while a signal of the second cell 200b acts as interference with a signal of the first cell 200a.

A basic method for addressing such an interference problem is using different frequencies for cells. However, since a frequency is a scarce and expensive resource, wireless service providers do not prefer a frequency division method.

Thus, the 3GPP employs a time division method to resolve the inter-cell interference problem.

Accordingly, the 3GPP has actively conducted studies on enhanced inter-cell interference coordination (eICIC) as an interference coordination method in recent years.

A time division method introduced in LTE-Release 10 has evolved as compared with a conventional frequency division method and thus is referred to as an enhanced ICIC. According to the time division method, an aggressor cell, which is a cell causing interference, suspends data transmission in a particular subframe so that a UE maintains connection to a victim cell, which is a cell undergoing the interference, in the subframe. That is, in the time division method, when different types of cells coexist, one cell temporarily suspends transmitting a signal to a UE having considerably high interference, thereby hardly sending an interference signal.

Meanwhile, the particular subframe in which data transmission is suspended is referred to as an almost blank subframe (ABS), in which no data is transmitted except for essential control data. The essential control data is, for example, a cell-specific reference signal (CRS). Therefore, not data but only CRSs are transmitted on OFDM symbols 0, 4, 7, and 11 in an ABS.

Figure 7:
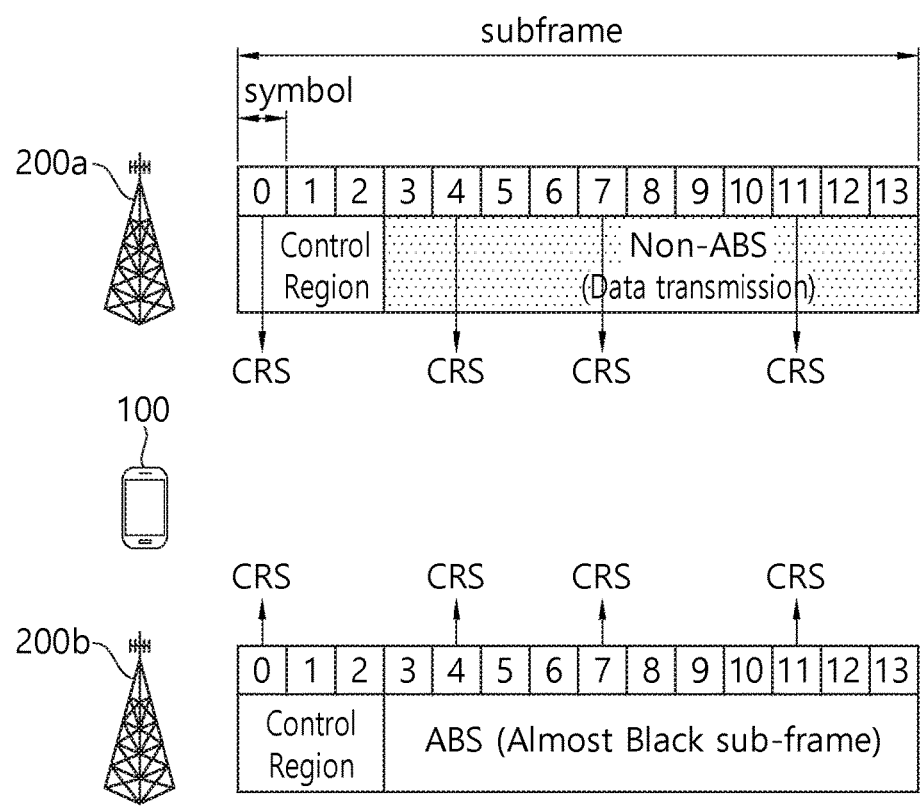
FIG. 7 illustrates enhanced inter-cell interference coordination (eICIC) to address interference between base stations.

FIG. 7 illustrates eICIC to address interference between BSs.

Referring to FIG. 7, data transmission is performed via a data region of a subframe for a first cell 200a.

Here, a second cell 200b applies eICIC to address interference. That is, when the eICIC is applied, a corresponding subframe is managed as an ABS, so that no data may be transmitted via the data region.

In the subframe managed as the ABS, only CRSs may be transmitted on symbols 0, 4, 7, and 11.

<Introduction of Small Cell>

It is expected that small cells with small cell coverage are added to the coverage of an existing cell in a next-generation mobile communication system and deal with greater traffic. The existing cell has relatively larger coverage than the small cells and thus is referred to as a macrocell, which is described with reference to FIG. 8.

Figure 8:
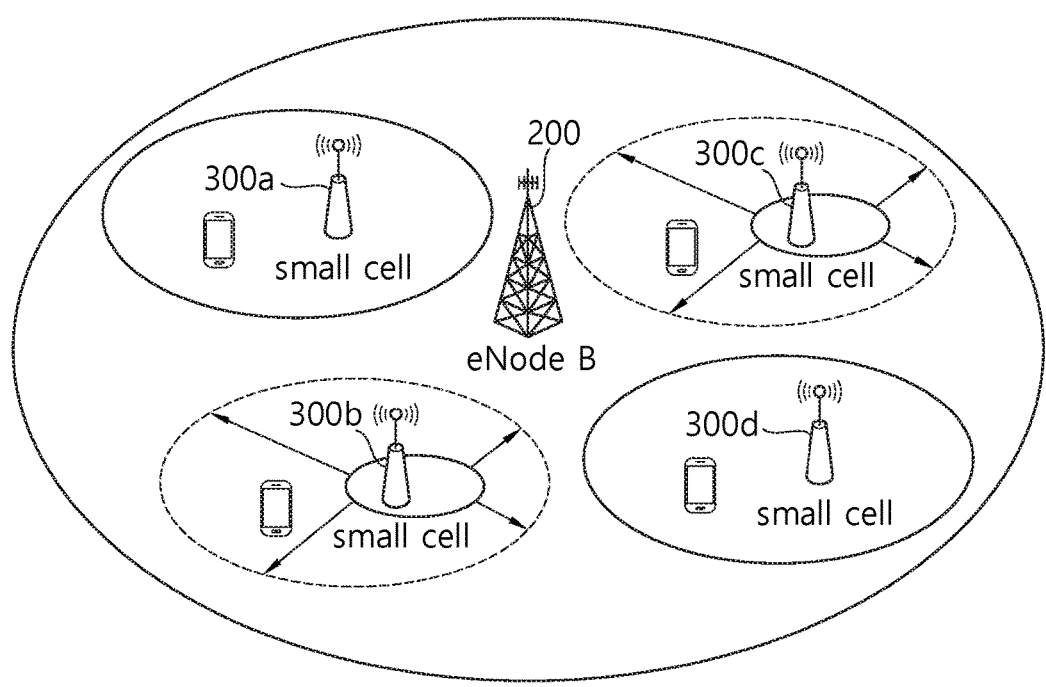
FIG. 8 illustrates an environment of a heterogeneous network including a macrocell and small cells as a potential next-generation wireless communication system.

FIG. 8 illustrates an environment of a heterogeneous network including a macrocell and small cells as a potential next-generation wireless communication system.

FIG. 8 shows a heterogeneous network environment in which a macrocell based on an existing BS 200 overlaps with small cells based on one or more small BSs 300*a*, 300*b*, 300*c*, and 300*d*. The existing BS provides relatively larger coverage than the small BSs and thus is also referred to as a macro BS (macro eNodeB: MeNB). In the present specification, a macrocell may be replaceable with a macro BS. A UE connected to the macrocell 200 may be referred to as a macro UE. The macro UE receives a downlink signal from the macro BS and transmits an uplink signal to the macro BS.

In this heterogeneous network, the macrocell is set as a primary cell (Pcell) and the small cells are set as secondary cells (Scell), thereby filling a gap in the macrocell coverage. Further, the small cells are set as primary cells (Pcell) and the macrocell is set as a secondary cell (Scell), thereby boosting overall performance.

The introduction of small cells, however, may aggravate inter-cell interference.

<Interference Cancellation>

As described above, in addition to solving the inter-cell interference problem through the eICIC method, there may be a method for performing, by UE 100, reception through interference cancellation (hereinafter referred to as "IC").

Figure 9A:
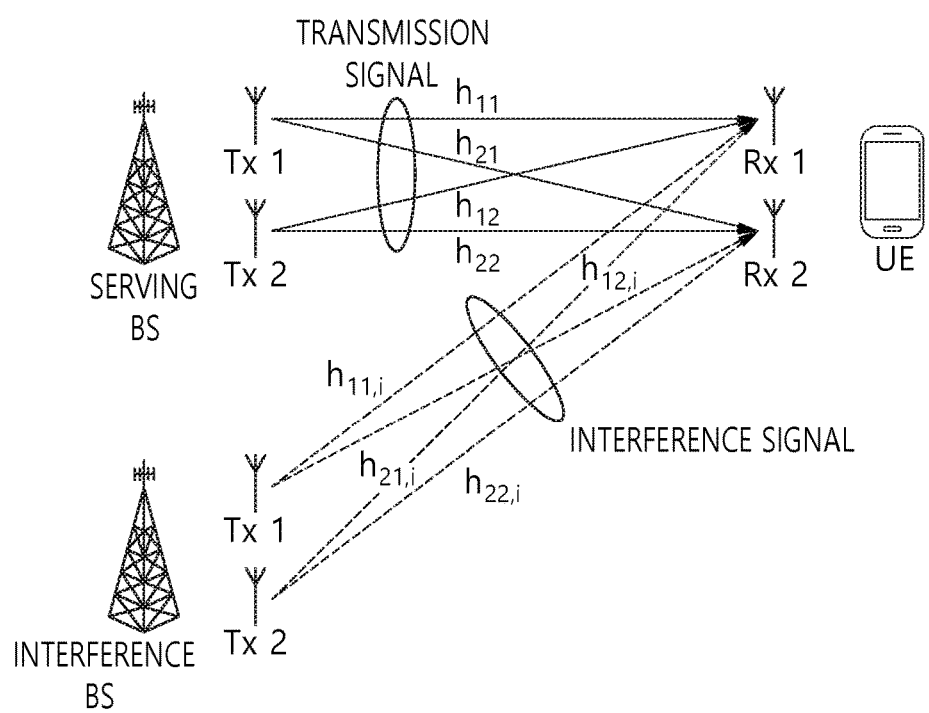
FIG. 9A is a view illustrating a situation in which a signal from a serving base station (BS) is interfered with by an interference signal from an interference BS.
Figure 9B:
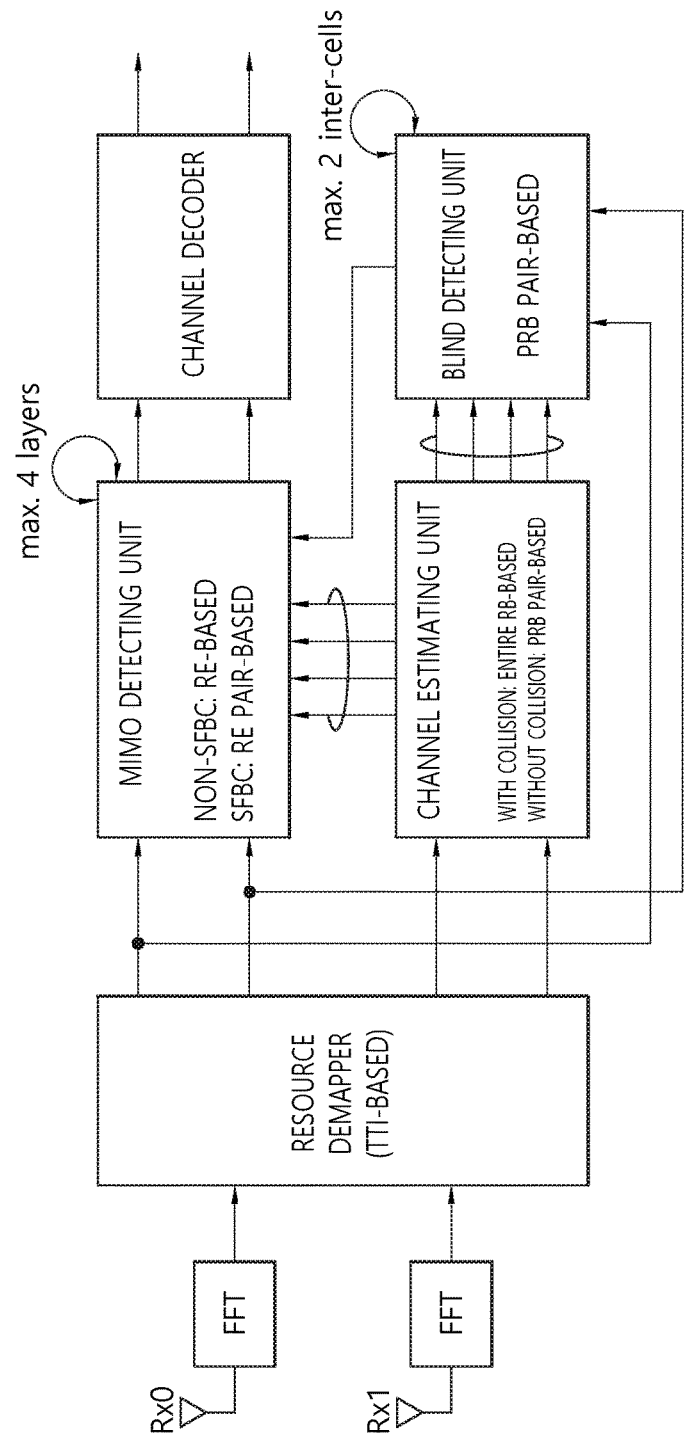
FIG. 9B is a view illustrating an architecture of a UE for interference cancellation reception.

FIG. 9*a* is an exemplary diagram showing a situation in which a signal from a serving eNB interferes with an interference signal from an interference eNB, and FIG. 9*b* shows the structure of UE for interference cancellation and suppression reception.

As may be seen with reference to FIG. 9*a*, there is shown an example in which signals transmitted by a serving eNB through two transmission antennas Tx1 and Tx2 interfere with interference signals from an adjacent interference eNB. It is assumed that the number of illustrated reception antennas of UE is 2 or 4.

In such an environment, a channel response attributable to the interference may be mathematically modeled as follows.

$$y_{n,k} = \sum_{i=0}^{N_{cell}} H_{n,k}^i P_i x_{n,k}^i + z_{n,k} \qquad \text{[Equation 1]}$$

$$\begin{bmatrix} y_{n,k,1} \\ \vdots \\ y_{n,k,b} \\ \vdots \\ y_{n,k,N_{rx}} \end{bmatrix} = \sum_{i=0}^{N_{cell}} \begin{bmatrix} h_{n,k,1}^{i,1} & \cdots & h_{n,k,1}^{i,N_{tx}^i} \\ \vdots & \ddots & \vdots \\ h_{n,k,N_{rx}}^{i,1} & \cdots & h_{n,k,N_{rx}}^{i,N_{tx}^i} \end{bmatrix} \begin{bmatrix} p_{i,1} & \cdots & p_{i,N_{layer}^i} \end{bmatrix} \begin{bmatrix} x_{n,k}^{i,1} \\ \vdots \\ x_{n,k}^{i,N_{layer}^i} \end{bmatrix} + \begin{bmatrix} z_{n,k,1} \\ \vdots \\ z_{n,k,b} \\ \vdots \\ z_{n,k,N_{rx}} \end{bmatrix} \in \square^{N_{rx}}$$

In Equation 1, $y_{n,k,b}$ indicates a signal received on an n-th OFDM symbol, and $k_{th}$ indicates a k-th RE in the b-th antenna of UE from an i-th eNB.

Furthermore, $x^{i,1}_{n,k}$ means a signal transmitted on the k-th RE of the i-th eNB through an l-th layer on the n-th OFDM symbol.

$z_{n,k,b}$ means adaptive white Gaussian noise on the n-th OFDM symbol and the k-th RE of the b-th antenna of the UE.

$h^{i,a}_{n,k,b}$ indicates an impulse channel response from the a-th antenna of the i-th eNB to n-th OFDM symbol and k-th RE of the b-th antenna of the UE.

$P_i$ indicates a precoding matrix of the i-th eNB. If $N^i_{layer}=1$, the precoding matrix is expressed by Pi.

$N_{rx}$ is the number of reception antennas.

$N^i_{tx}$ is the number of transmission antennas of the i-th eNB $N^i_{layer}$ is the number of transmission layers from the i-th eNB.

Referring to FIG. 9B, an interference cancellation (IC) receiving unit of the UE includes an FFT, a resource demapper, a channel estimating unit, a blind detecting unit, a MIMO detecting unit, and a channel decoder. The channel estimation unit estimates a channel based on a received signal. The MIMO detecting unit performs MIMO detection based on an output from the channel estimating unit and the blind detecting unit. The channel decoder performs channel decoding using a signal output from the MIMO detecting unit.

Meanwhile, the IC receiving unit may use a CRS-based reference signal received power (RSRP) or reception power of a PDSCH in order to select a cell for canceling interference. This will be described with reference to the accompanying drawing as follows.

Figure 10A:
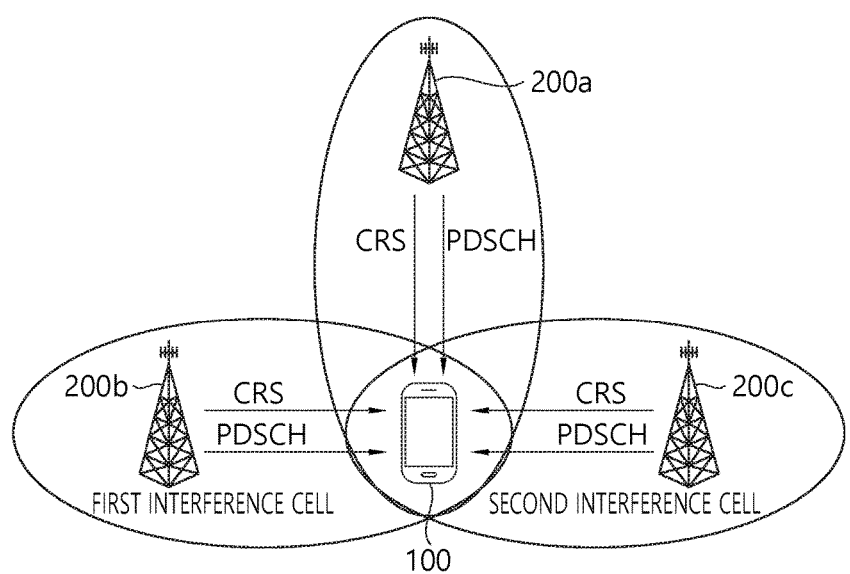
FIG. 10A is a view illustrating a situation in which two interference cells are present in the vicinity of a serving cell.
Figure 10B:
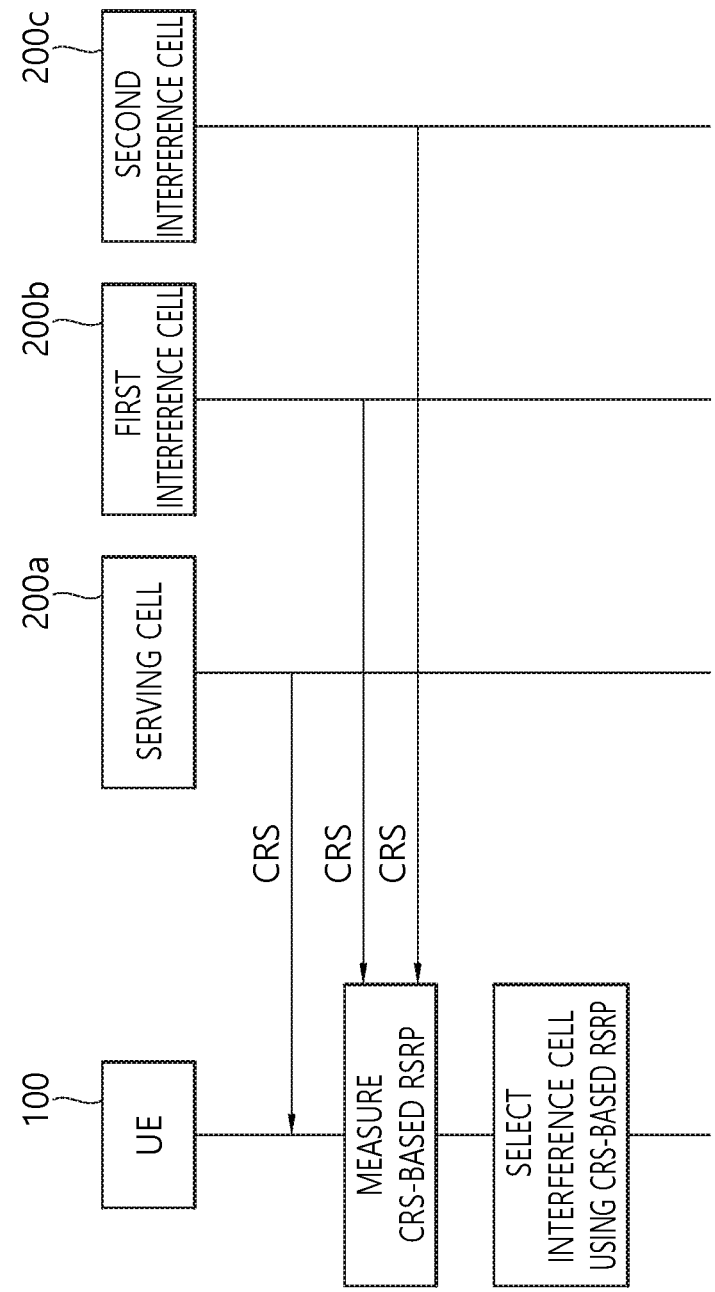
FIG. 10B is a view illustrating a method of selecting an interference cell based on a CRS.

FIG. 10A is a view illustrating a situation in which two interference cells are present in the vicinity of a serving cell, FIG. 10B is a view illustrating a method of selecting an interference cell based on a CRS, and FIG. 10C is a view illustrating a method of selecting an interference cell based on reception power of a PDSCH.

Referring to FIG. 10A, two interference cells 200*b* and 200*c* are present in the vicinity of a serving cell 200*a*. The serving cell 200*a*, a first interference cell 200*b*, and a second interference cell 200*c* each transmit a CRS and a PDSCH.

Then, a UE 100 may use a cell-specific reference signal (CRS)-based reference signal received power (RSRP) or reception power of the PDSCH in order to select a cell for canceling interference.

First, the use of the CRS-based RSRP to select an interference cell will be described with reference to FIG. 10B. In general, the UE 100 measures and reports RSRP based on the CRS regarding an neighboring cell, and thus, the UE 100 has the RSRP regarding the neighboring cell. Thus, the UE may select an neighboring cell having highest RSRP as an interference cancellation target cell (or a cell for which to perform interference cancellation).

When the CRS-based RSRP is used, there is no need to add an additional element to a CI receiving unit of the UE, having advantages that complexity is not increased and there is no additional power consumption, but it may be difficult to accurately select an interference cell due to a difference with power of the PDSCH acting as actual interference.

In detail, in cases where a transmission mode of the serving cell and the interference cell is the CRS, actual reception power of the PDSCH from the interference cell may be larger or smaller than reception power of the CRS according to $\rho_A$ (a ratio of power of the PDSCH to power of the CRS).

Here, in the case of PDSCH data transmission using precoding for transmit diversity having four cell-specific antenna ports, $\rho_A$ may be expressed as follows.

$$\rho_A = \delta_{power\text{-}offset} + P_A + 10\log_{10}(2) \text{ [dB]}$$

However, in other general cases, $\rho_A$ may be expressed as follows.

$$\rho_A = \delta_{power\text{-}offset} + P_A \text{ [dB]}$$

Here, $\delta_{power\text{-}offset}$ is 0 dB in every PDSCH transmission scheme excluding the case of multi-user MIMO. Thus, in most cases, actual power of the PDSCH from the interference cell is dependent upon $P_A$.

Here, $P_A$, a parameter for calculating a ratio of power of the PDSCH to power of the CRS, is included and received in a PDSCH configuration through higher layer signaling, e.g., RRC signaling, from the serving cell. A $\rho_A$ value defined in the current 3GPP specification is {−6, −4.77, −3, −1, 0, 1, 2, 3}.

Thus, PDSCH power of the serving cell and the interference cell may be significantly different from the CRS power.

The use of PDSCH reception power to select an interference cell will be described with reference to FIG. 10C. In order for the UE 100 to determine an interference cell based on the PDSCH, the UE 100 may obtain related information such as PMI, $P_A$, and the like, through blind detection regarding a PDSCH of an neighboring cell and measure reception power of the PDSCH from a neighboring cell as illustrated in FIG. 10C.

In this manner, when reception power of the PDSCH from a neighboring cell is used, an interference cell causing significant interference, among several neighboring cells, may be accurately selected by measuring accurate power of the PDSCH acting as actual interference. To this end, however, the interfered UE should operate the blind detecting unit of the IC receiving unit for every neighboring cell therearound, complexity is increased and power consumption is large.

Also, in cases where a transmission mode of neighboring cells is based on demodulation reference signal (DMRS), if a neighboring cell transmits a PDSCH to a UE thereof through beamforming, a difference between CRS-based RSRP of the neighboring cell measured by the interfered UE and reception power of the PDSCH is significant. Here, it may be more difficult to obtain excellent performance gain, compared with a case in which the interfered UE drives the IC receiving unit to consume power.

In particular, in cases where an neighboring cell operates according to a CoMP scenario 4 (CoMP using the same cell ID), when TPs within a CoMP cluster transmit the CRS, the interfered UE may measure CRS RSRP larger than those of other neighboring cells. However, since only one of the several TPs actually transmits the PDSCH in the CoMP scenario 4 environment, reception power of an interference PDSCH to be removed by the interfered UE may be considerably small. Here, although the interfered UE drives the IC receiving unit, it is difficult to obtain performance gain.

<Present Disclosure>

Thus, in order to solve the aforementioned problem, the present disclosure proposes a scheme of effectively selecting an IC target cell by a UE.

In detail, the present disclosure proposes a scheme of selecting an interference cell using a difference between CRS-based RSRP from each neighboring cell (or each component carrier when a neighbor BS uses carrier aggregation) and PDSCH reception power from a serving cell.

Figure 11:
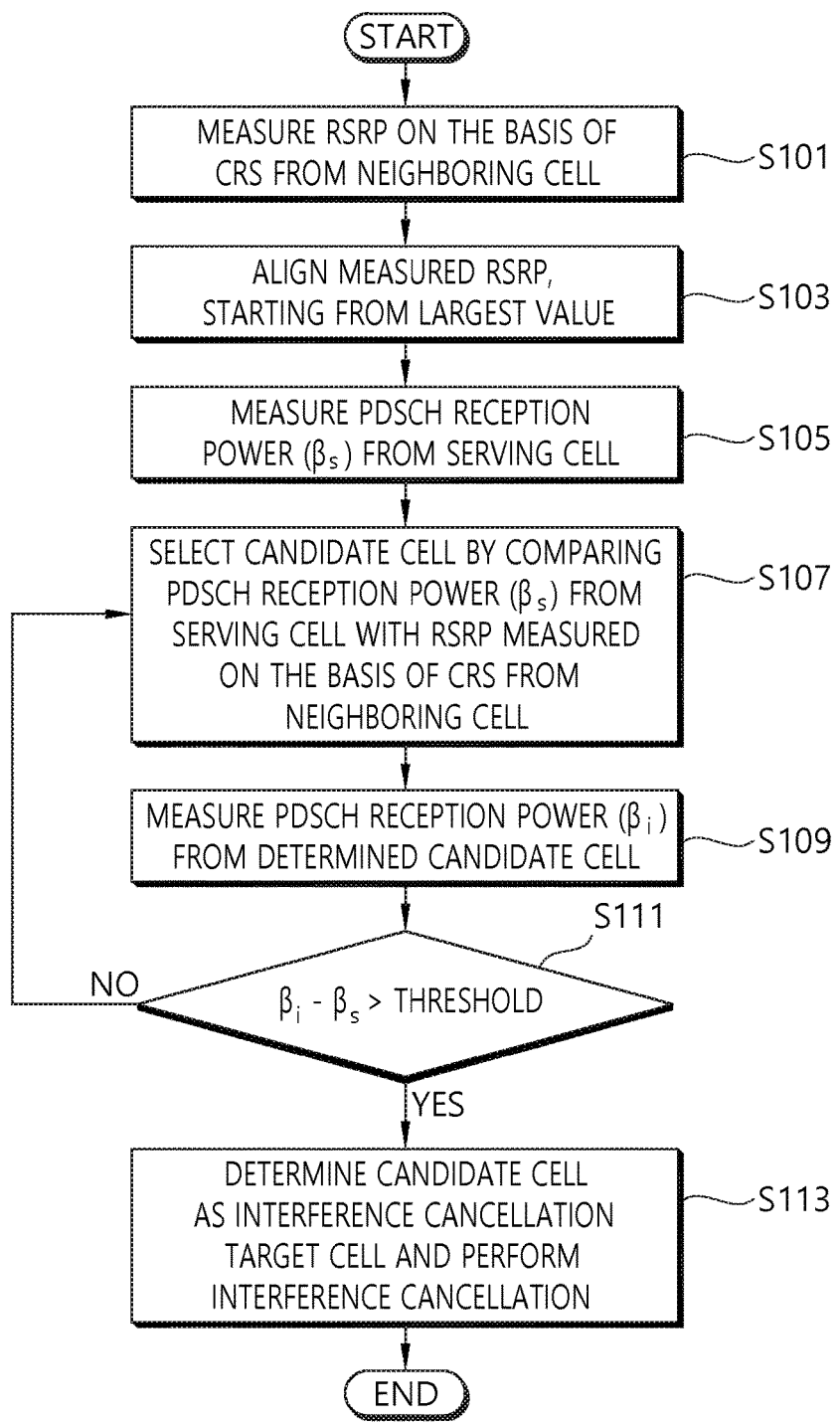
FIG. 11 is a flow chart illustrating a method of selecting a cell as a target of interference cancellation (or a cell for which to perform interference cancellation) according to the present disclosure.

FIG. 11 is a flow chart illustrating a method of selecting a cell as a target of interference cancellation according to the present disclosure.

Referring to FIG. 11, the UE measures reception power of reference signals from neighboring cells (S101). That is, the UE measures RSRP based on CRSs received from neighboring cells.

Next, the interfered UE aligns the measured reception power (i.e., RSRP) regarding the neighboring cells, starting from a highest value, i.e., in order of $\alpha_1$ ($1^{st}$ dominant interfering cell), $\alpha_2$ ($2^{nd}$ dominant interfering cell), $\alpha_k$ ($k_{th}$ dominant interfering cell) (S103).

Thereafter, the interfered UE measures reception power $\beta_s$ of a data channel (i.e., PDSCH) from a serving cell (S105).

Here, the serving cell may use the reference signal-based reception power (i.e., the CRS-based RSRP). However, since reception power of the PDSCH has a difference by the value $P_A$, compared with reception power of the CRS, as mentioned above, PDSCH reception power from the serving cell may be actually lower by 6 dB or larger than the CRS reception power. Also, in cases where the PDSCH reception power from the interference cell is larger by at least 3 dB than the CRS reception power, a case in which a corresponding interference cell is excluded may occur. Also, since the UE is able to measure reception power $\beta_s$ of the PDSCH from the serving cell, it may be more effective to measure and use reception power of the PDSCH than the CRS-based RSRP.

That is, when a cell to be an interference cancellation target is selected, CRS reception power from a neighboring cell is considered, but here, it may be more effective to consider PDSCH reception power from the serving cell. For example, in FIG. 10B, it is assumed that RSRP measured based on a CRS from the serving cell is larger than RSRP measured based on a CRS from a first interference cell. Here, in cases where a $P_A$ value of the serving cell is −X dB (allocation of low PDSCH power, relative to CRS power) and a $P_A$ value of the first interference cell is +Y dB, a PDSCH from the first interference cell actually makes a significant interference influence on the PDSCH from the serving cell. However, in cases where an interference cell is selected through CRS-based RARP, the UE may not select and exclude the first interference cell as a target for interference cancellation, which may be a problem. In contrast, in cases where PDSCH reception power from the serving cell is considered according to the present disclosure, the UE may select the first interference cell as a target of interference cancellation, obtaining reception performance enhancement.

In another example, in FIG. 10B, it is assumed that RSRP measured based on a CRS from the serving cell is smaller than RSRP measured based on a CRS from the first interference cell. Here, in cases where a $P_A$ value of the serving cell is +X dB (allocation of high PDSCH power, relative to CRS power) and a $P_A$ value of the first interference cell is +Y dB, a PDSCH from the first interference cell does not significantly interfere with on the PDSCH from the serving cell. However, in cases where an interference cell is selected through CRS-based RARP, the UE may always select the first interference cell as a target for interference cancellation, which may be ineffective. In contrast, in cases where PDSCH reception power from the serving cell is considered according to the present disclosure, the UE may not select the first interference cell as a target of interference cancellation.

Referring back to FIG. 11, in order to select a candidate cell having a high possibility of being an interference cancellation target cell, the UE compares CRS RSRP (i.e., $\alpha_i$) of each neighboring cell with PDSCH reception power ($\beta_s$) of the serving cell, and determines a cell having a ratio thereof larger than a threshold ($\delta$) as a candidate cell ($D_{inf}$) of interference cancellation target (S107). That is, the UE determines the candidate cell ($D_{inf}$) of interference cancellation target according to Equation 2 below.

$$D_{inf} = \left\{ i \,\middle|\, \frac{\alpha_i}{\beta_s} > \delta, i = 1, 2, \ldots, k \right\}$$ [Equation 2]

Next, the UE performs blind detection on a PDSCH from the candidate cell of the interference cancellation target and measures reception power ($\beta_i$) of the PDSCH from the candidate cell based on the blind detection (S109).

Thereafter, the UE determines whether a difference between the PDSCH reception power ($\beta_s$) from the serving cell and the PDSCH reception power ($\beta_i$) from the candidate cell is larger than a threshold (S111). The reason for comparing the difference with the threshold is because a gain obtained by canceling interference is small unless the PDSCH reception power ($\beta_i$) from the candidate cell, although being larger than the PDSHC reception power ($\beta_s$) from the serving cell, is at least a predetermined signal strength.

$$\beta_i - \beta_s > Th_{PDSCH\_gap}$$ [Equation 3]

When the difference between the PDSCH reception power ($\beta_s$) from the serving cell and the PDSCH reception power ($\beta_i$) from the candidate cell is larger than the threshold, the UE determines the candidate cell as an interference cancellation target cell and performs interference cancellation (S113).

If, however, when the difference between the PDSCH reception power ($\beta_s$) from the serving cell and the PDSCH reception power ($\beta_i$) from the candidate cell is not larger than the threshold, the UE determines that an actual interference magnitude is small and excludes it from the interference cancellation target. Also, the UE, returning to step S107, selects another candidate cell. Here, the number of interference cancellation cells that the UE can support may be varied depending on the number of MIMO layers or the number of carrier-aggregated component carriers, and thus, the UE selects cells as many as the UE is able to cancel, as interference cancellation target cells.

The embodiments of the present invention described above may be implemented by various means. For example, the embodiments of the present invention may be implemented by hardware, firmware, software, or any combinations thereof. Details thereof will be described with reference to the accompanying drawings.

Figure 12:
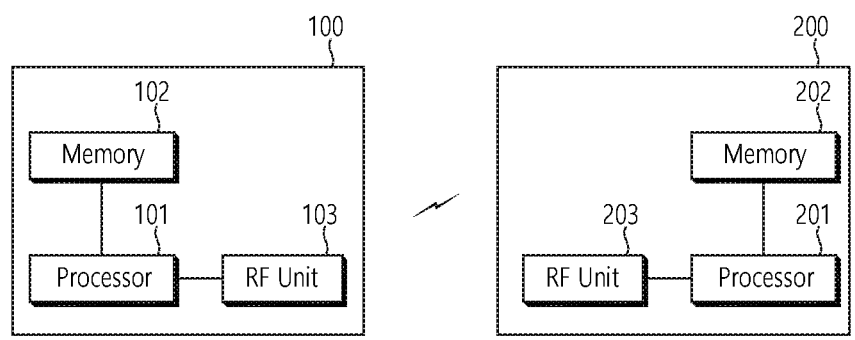
FIG. 12 is a block diagram illustrating a wireless communication system implementing the present disclosure.

FIG. 12 is a block diagram of a wireless communication system implementing the present disclosure.

A BS 200 includes a processor 201, a memory 202, and a radio frequency (RF) unit 203. The memory 202 is connected to the processor 201 and stores various types of information for driving the processor 201. The RF unit 203 is connected to the processor 201 and transmits and/or receives a radio signal. The processor 201 implements the proposed function, process, and/or method. In the aforementioned embodiment, an operation of the BS 200 may be implemented by the processor 201.

A UE 100 includes a processor 101, a memory 102, and an RF unit 103. The memory 102 is connected to the processor 101 and stores various types of information for driving the processor 101. The RF unit 103 is connected to the processor 101 and transmits and/or receives a radio signal. The processor 101 implements the proposed function, process, and/or method.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for selecting an interference cancellation target cell, the method comprising:
    measuring reception power based on reference signals received from neighboring cells;
    measuring reception power of a first physical data shared channel (PDSCH) received from a serving cell;
    comparing the reception power of the first PDSCH from the serving cell with the reception power from the neighboring cells;
    selecting a candidate cell from among the neighboring cells;
    performing blind detection only on the candidate cell;
    measuring reception power of a second PDSCH from the neighboring cell based on the blind detection;
    comparing the reception power of the second PDSCH from the neighboring cell with the reception power of the first PDSCH from the serving cell; and
    when the reception power of the second PDSCH from the neighboring cell is larger, by at least a threshold, compared to the reception power of the first PDSCH from the serving cell, selecting the candidate cell as an interference cancellation target cell.

2. The method of claim 1, further comprising:
    canceling interference based on a PDSCH received from the selected interference cancellation target cell.

3. The method of claim 1, wherein a parameter for calculating a ratio of power of a PDSCH to power of an interference cell reference signal is obtained.

4. The method of claim 1, wherein when the reception power of the second PDSCH from the neighboring cell, through blind detection, is not larger by at least the threshold, than the reception power of the first PDSCH from the serving cell, the process is returned to the selecting of a candidate cell.

5. The method of claim 1, wherein the reference signal is a cell-specific reference signal (CRS) and reception power, based on the reference signal, is reference signal received power (RSRP).

6. A user equipment (UE) performing reception after canceling interference, the UE comprising:
a transmitter and a receiver; and
a processor, operatively coupled to the transmitter and the receiver,
wherein the processor is configured to:
measure reception power based on reference signals received from neighboring cells;
measure reception power of a first physical data shared channel (PDSCH) received from a serving cell;
compare the reception power of the first PDSCH from the serving cell with the reception power from the neighboring cells;
select a candidate cell from among the neighboring cells;
perform blind detection only on the candidate cell;
measure reception power of a second PDSCH from a neighboring cell based on the blind detection;
compare the reception power of the second PDSCH from the neighboring cell with the reception power of the first PDSCH from the serving cell; and
when the reception power of the second PDSCH from the neighboring cell is larger, by at least a threshold, compared to the reception power of the first PDSCH from the serving cell, selecting the candidate cell as an interference cancellation target cell.

7. The UE of claim 6, wherein the processor is further configured to cancel interference based on a PDSCH received from the selected interference cancellation target cell.

8. The UE of claim 6, wherein a parameter for calculating a ratio of power of a PDSCH to power of a reference signal is obtained through the blind detection.

9. The UE of claim 6, wherein when the reception power of the second PDSCH from the neighboring cell, through blind detection, is not larger by at least the threshold, than the reception power of the first PDSCH from the serving cell, the processor is further configured to return to the step of selecting the candidate cell.

10. The UE of claim 6, wherein the reference signal is a cell-specific reference signal (CRS) and reception power, based on the reference signal, is reference signal received power (RSRP).

* * * * *